United States Patent [19]
Chen

[11] Patent Number: 5,661,908
[45] Date of Patent: Sep. 2, 1997

[54] MULTIFUNCTIONAL FOLDABLE SAW

[76] Inventor: Tsai-Yuan Chen, No.2, Lane 52, Hsin-Jen 3rd St., Ta-Li City, Taichung Hsien, Taiwan

[21] Appl. No.: 697,005

[22] Filed: Aug. 16, 1996

[51] Int. Cl.⁶ ................................................ B23D 51/01
[52] U.S. Cl. ............................... 30/125; 30/161; 30/517; 30/519
[58] Field of Search ........................... 30/125, 160, 161, 30/517, 519, 331, 332, 333, 329, 522, 523

[56] References Cited

U.S. PATENT DOCUMENTS

| 1,638,749 | 8/1927 | Santoyo | 30/161 |
| 4,918,820 | 4/1990 | Korb et al. | 30/161 |
| 5,023,996 | 6/1991 | Pape et al. | 30/125 X |
| 5,303,469 | 4/1994 | Yin-Han | 30/517 X |

FOREIGN PATENT DOCUMENTS 164305  10/1949  Austria ................... 30/519

*Primary Examiner*—Douglas D. Watts
*Attorney, Agent, or Firm*—Morton J. Rosenberg; David I. Klein

[57] ABSTRACT

This disclosure concerns a foldable saw. It includes a main body, an upper cover disposed on an upper wall of the main body, a lower cover disposed on a lower wall of the main body and a rear cover. This foldable saw has receptacles for receiving spare saw blades which can be taken out to replace the original one. Also, this foldable saw can store several saw blades and these saw blades can be changed for different purposes when it is needed.

4 Claims, 4 Drawing Sheets

MULTIFUNCTIONAL FOLDABLE SAW

BACKGROUND OF THE INVENTION

The present invention relates to a multifunctional foldable saw having receptacles for receiving spare saw blades.

A conventional foldable saw includes a single saw blade which can be folded into a main body when not used so as to ensure safety. In the case of abrasion or breakage of the saw blade or when it is necessary to use a different saw blade with different saw teeth or function, the saw blade must be replaced by a spare one. However, the saw blade has a considerably long length and sharp teeth so that it is dangerous and inconvenient for a user to carry the spare saw blade with him.

SUMMARY OF THE INVENTION

It is therefore a primary object of the present invention to provide a multifunctional foldable saw having receptacles for receiving spare saw blades which can be taken out to replace the original one.

It is therefore another object of the present invention to provide a multifunctional foldable saw which can store several saw blades and these saw blades can be changed for different purposes when it is needed.

The present invention can be best understood through the following description and accompanying drawing, wherein:

DETAILED DESCRIPTION OF THE PREFERRED EMBODIMENT

Figure 1:
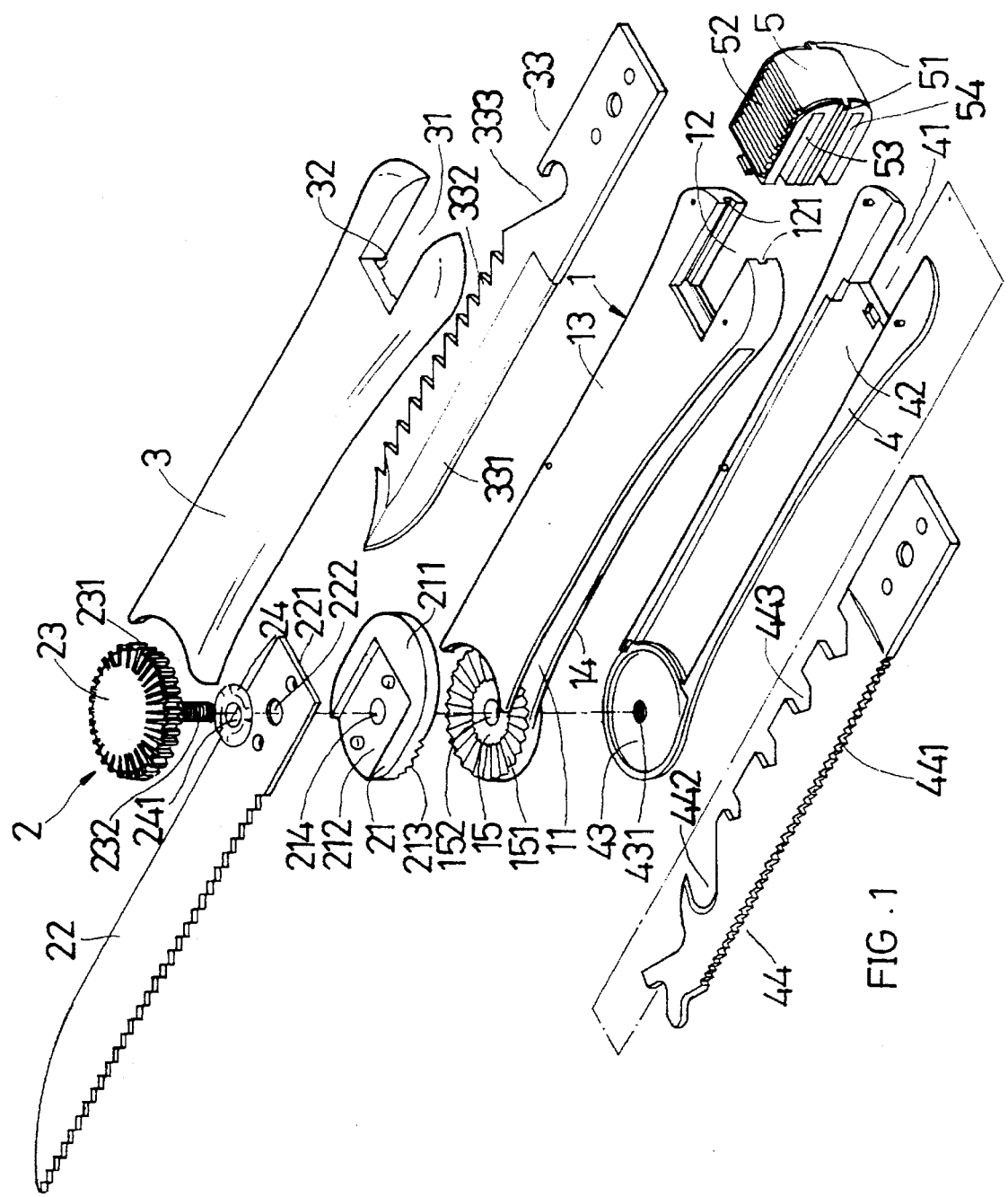
FIG. 1 is a perspective exploded view of the present invention.
Figure 2:
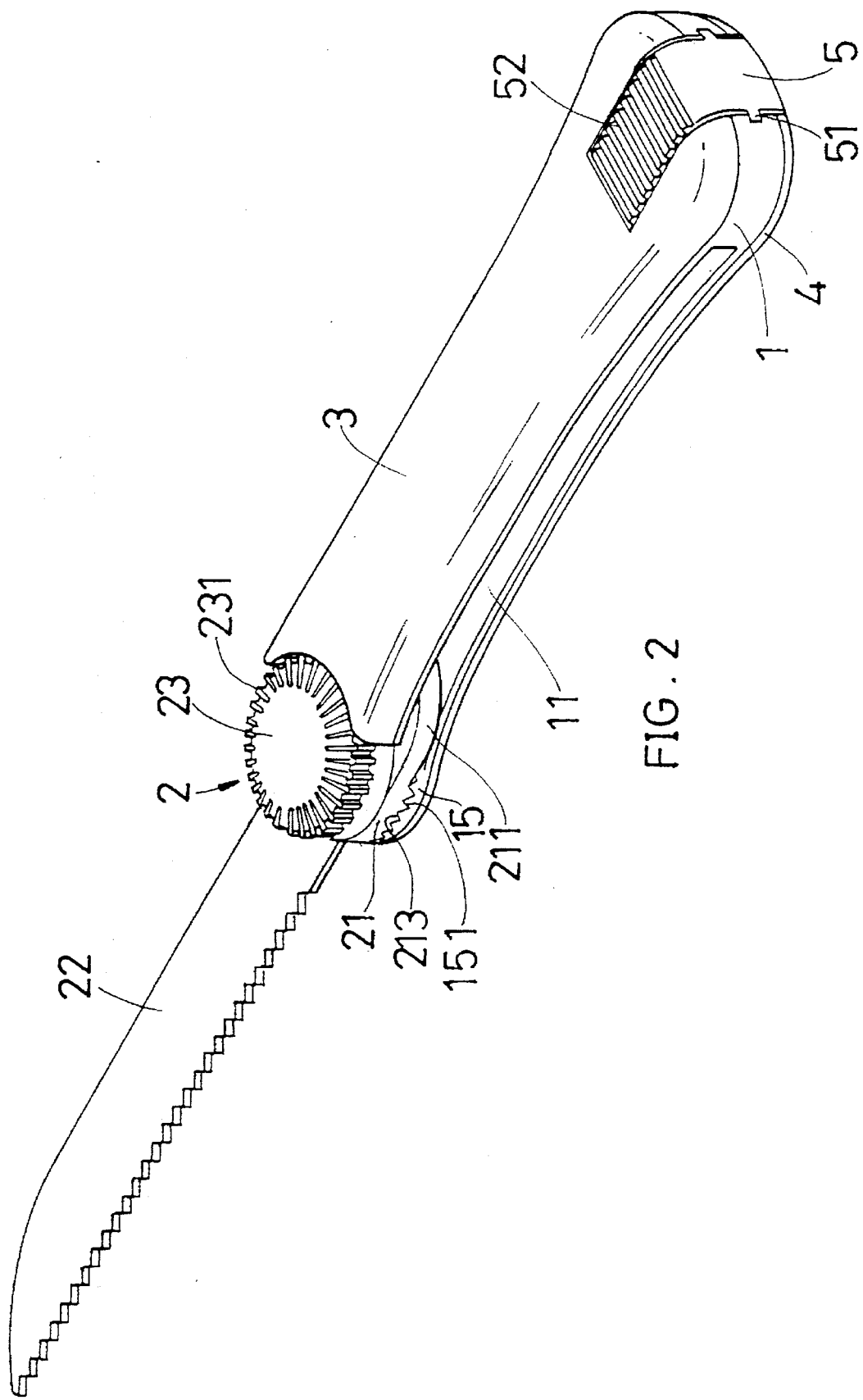
FIG. 2 is a perspective assembled view of the present invention in a used state.
Figure 3:
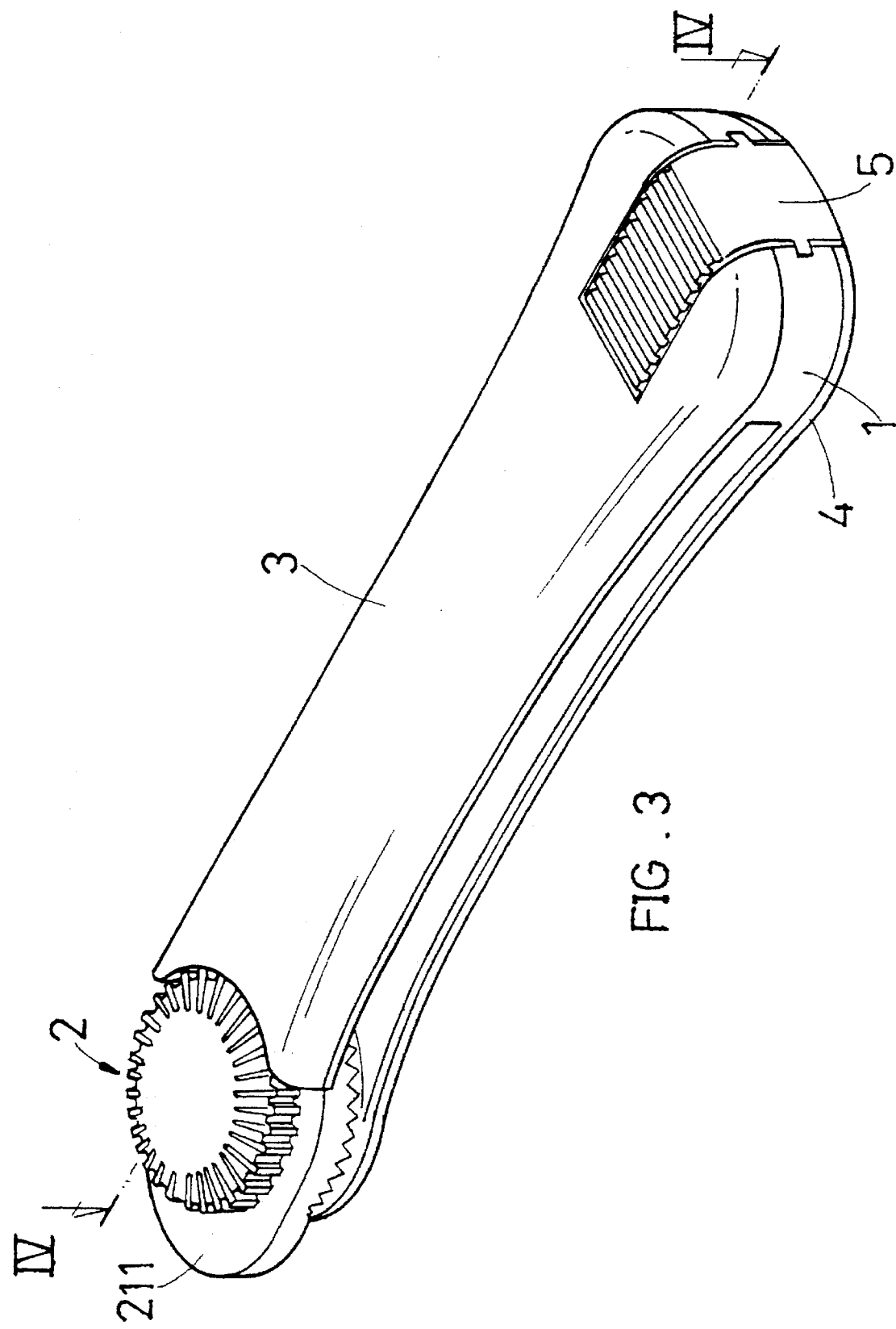
FIG. 3 is a perspective assembled view of the present invention in a folded state.
Figure 4:
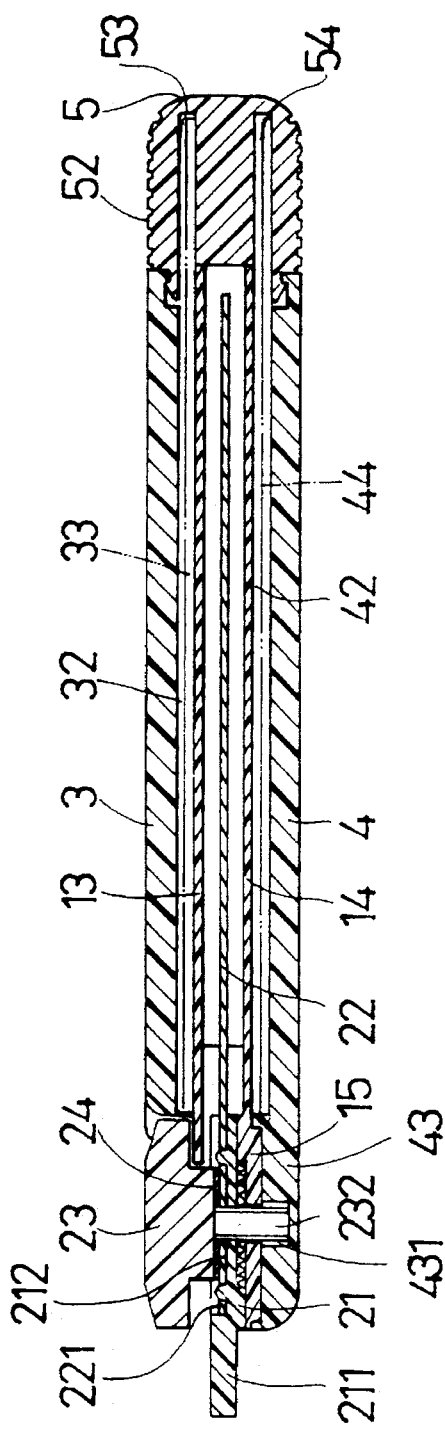
FIG. 4 is a sectional view taken along line IV—IV of FIG. 3.

Please refer to FIGS. 1 to 3. The foldable saw of the present invention includes a main body 1, a locating mechanism 2, an upper cover 3, a lower cover 4 and a rear cover 5.

The main body 1 is an elongated flat member formed with a longitudinal slot 11 along a lateral side. A slipproof seat 15 is integrally formed on a lower wall 14 of a front end of the main body 1. The slipproof seat 15 is formed with radial slipproof dents 151 and a central through hole 152. A rear end of the main body 1 is disposed with a notch 12. Two channels 121 are respectively formed on two opposite lateral walls of the notch 12.

The locating mechanism 2 is disposed at the front end of the main body 1, including a saw blade seat 21, a saw blade 22, a rotary switch 23 and a leaf spring 24.

The saw blade seat 21 is disposed on the slipproof seat 15, having a driven section 211, a central through hole 214 and a recess 212 on upper face. A lower face of the saw blade seat 21 is formed with radial slipproof dents 213 corresponding to the slipproof dents 151 of the slipproof seat 15.

The saw blade 22 has a projecting section 221 integrally extending from a rear end thereof. The projecting section 221 is formed with a through hole 222.

The rotary switch 23 i a disk-like body having peripheral slipproof teeth 231 and a thread rod 232 downward extending from the center of lower side.

The leaf spring 24 is formed with a central through hole 241.

The thread rod 232 of the rotary switch 23 is passed through the through hole 241 of the leaf spring 24, the through hole 222 of the projecting section 221 of the saw blade 22, the through hole 214 of the saw blade seat 21 and the through hole 152 of the slipproof seat 15 to be screwed into a thread hole 431 of a fixing seat 43 of the lower cover 4, whereby the projecting section 221 of the saw blade 22 is secured in the recess 212 of the saw blade seat 21.

The upper cover 3 is disposed on an upper wall 13 of the main body 1 and fixedly fused therewith by ultrasonic wave. A rear end of the upper cover 3 is formed with a notch 31. In addition, an inner face of the upper cover 3, which contacts with the upper wall 13 of the main body 1, is formed with a receptacle 32 extending to the notch 31, whereby the notch 31 serves as an opening of the receptacle 32 for receiving a spare saw blade 33 therein.

The lower cover 4 is disposed on a lower wall 14 of the main body 1 and fixedly fused therewith by ultrasonic wave. A rear end of the lower cover 4 is formed with a notch 41. In addition, an inner face of the lower cover 4, which contacts with the lower wall 14 of the main body 1, is formed with a receptacle 42 extending to the notch 41, whereby the notch 41 serves as an opening of the receptacle 42 for receiving a spare saw blade 44 therein. A fixing seat 43 is integrally formed at a front end of the lower cover 4. The fixing seat 43 is formed with a central thread hole 431 for the thread rod 232 of the rotary switch 23 to screw thereinto.

The rear cover 5 is formed with two fissures 53, 54 for longer saw blades to extend thereinto. Two rails 51 are respectively disposed on two sides of the rear cover 5 for slidably fitting into the channels 121 of the notch 12 of the main body 1. By means of the clearances of the fissures 53, 54, the rear cover 5 can be resiliently inserted into the notch 12. The upper and lower faces of the rear cover 5 are formed with slipproof stripes 52 for increasing frictional force.

The upper and lower walls 13, 14 of the main body 1 and the receptacles 32, 42 of the upper and lower covers 3, 4 define two rooms for receiving the spare saw blades 33, 44, whereby when the rear cover 5 is pushed and inserted into the notch 12 of the main body 1, the rooms are closed. After the rear cover 5 is pulled out, the spare saw blades 33, 44 can be taken out for replacement.

In use, the rotary switch 23 is first untightened to disengage the slipproof dents 212 of the saw blade seat 21 from the slipproof dents 151 of the slipproof seat 15, forming a clearance between the saw blade seat 21 and the slipproof seat 15. Then the driven section 211 is rotated to unfold the saw blade 22 out of the slot 11 of the main body 1. Then the rotary switch 23 is tightened, forcing the leaf spring 24 to tightly abut against the saw blade 22 and the saw blade seat 21, whereby the slipproof dents 212 of the saw blade seat 21 are engaged with the slipproof dents 151 of the slipproof seat 1.

When it is desired to fold the saw blade, the rotary switch 23 is untightened and the saw blade 22 is rotated into the slot 11 of the main body 1.

In FIG. 1, the saw blade 33 has a blade section 331 on one side and a saw tooth section 332 on the other side. In addition, the rear portion of the blade section 331 is formed with a bottle opener 333. The other saw blade 44 has a saw tooth section 441 on one side and a fish cutter 442 and multiple notches 443 for driving bolts on the other side. The front end of the saw blade 44 serves as a screwdriver.

Figure 5:
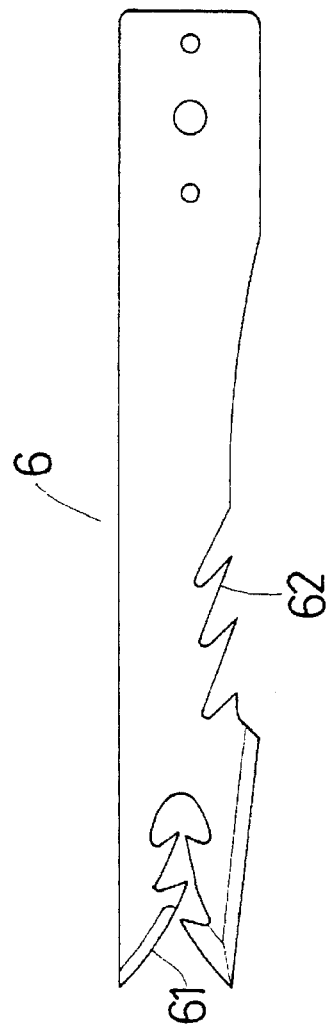
FIG. 5 shows another type of saw blade of the present invention.

FIG. 5 shows another type of saw blade 6 having a front end 61 serving to extract slender weeds, and a lateral side 62 serving to extract rough weeds.

It should be noted that the upper and lower walls 13, 14 and the receptacles 32, 42 of the upper and lower covers 3, 4 define two rooms therebetween for receiving the spare saw blades 33, 44. The receptacles 32, 42 extend to the notches 31, 41 of the upper and lower covers 3, 4 so that the spare saw blades 33, 44 can be placed into the receptacles 32, 42 through the notches 31, 41. The rear cover 5 is inserted into the notch 12 of the main body 1 to close the receptacles 32, 42. Accordingly, the foldable saw of the present invention is provided with rooms for storing the spare saw blades. Therefore, it is unnecessary for a user to additionally carry any spare saw blade.

It is to be understood that the above description and drawings are only used for illustrating one embodiment of the present invention, not intended to limit the scope thereof. Any variation and derivation from the above description and drawings should be included in the scope of the present invention.

What is claimed is:

1. A multifunctional foldable saw comprising:

a main body formed with a longitudinal slot along a lateral side, a rear end of the main body being disposed with a notch, two channels being respectively formed on two opposite lateral walls of the notch;

a saw blade locating mechanism disposed at a front end of the main body;

an upper cover disposed on an upper wall of the main body, a rear end of the upper cover being formed with a notch, an inner face of the upper cover, which contacts with an upper wall of the main body, being formed with a receptacle extending to the notch of the rear end, whereby the notch serves as an opening of the receptacle for receiving a spare saw blade therein;

a lower cover disposed on a lower wall of the main body, a rear end of the lower cover being formed with a notch, an inner face of the lower cover, which contacts with the lower wall of the main body, being formed with a receptacle extending to the notch of the rear end, whereby the notch serves as an opening of the receptacle for receiving a spare saw blade therein, a fixing seat being integrally formed at a front end of the lower cover; and a rear cover formed with two fissures, two rails being respectively disposed on two sides of the rear cover for slidably fitting into the channels of the notch of the main body so as to insert the rear cover into the notch of the main body.

2. A multifunctional foldable saw as claimed in claim 1, wherein a slipproof seat is integrally formed on the lower wall of the front end of the main body, the slipproof seat being formed with radial slipproof dents and a central through hole, the locating mechanism including:

a saw blade seat disposed on the slipproof seat, having a driven section, a central through hole and a recess on upper face, a lower face of the saw blade seat being formed with radial slipproof dents corresponding to the slipproof dents of the slipproof seat;

a saw blade having a projecting section integrally extending from a rear end thereof, the projecting section being formed with a through hole;

a rotary switch which is a disk-like body having peripheral slipproof teeth and a thread rod downward extending from the center of lower side; and a leaf spring formed with a central through hole; whereby the thread rod of the rotary switch is passed through the through hole of the leaf spring, the through hole of the projecting section of the saw blade, the through hole of the saw blade seat and the through hole of the slipproof seat to be screwed into a thread hole of the fixing seat of the lower cover, whereby the projecting section of the saw blade is secured in the recess of the saw blade seat.

3. A multifunctional foldable saw as claimed in claim 1, wherein the upper and lower covers are fused with the main body by ultrasonic wave.

4. A multifunctional foldable saw as claimed in claim 1, wherein an upper and a lower faces of the rear cover are disposed with slipproof stripes.

* * * * *